United States Patent [19]

Schlickeiser

[11] 3,869,715

[45] Mar. 4, 1975

[54] DIGITAL STORAGE HAVING A PLURALITY OF INFORMATION SEQUENCES IN A SINGLE TRACK

[76] Inventor: Klaus Schlickeiser, Webkrenzstrab 212, Boll near Hechingen, Germany

[22] Filed: Oct. 18, 1973

[21] Appl. No.: 407,596

Related U.S. Application Data

[62] Division of Ser. No. 162,083, Pat. No. 3,772,664.

[30] Foreign Application Priority Data

July 14, 1970 Germany ............................ 2034836

[52] U.S. Cl. ..................................... 360/48, 360/52

[51] Int. Cl. ............................................. G11b 5/09

[58] Field of Search .................... 360/47, 48, 50, 52

[56] References Cited

UNITED STATES PATENTS

| | | | |
|---|---|---|---|
| 3,088,101 | 4/1963 | Schrimpf | 360/48 |
| 3,426,336 | 2/1969 | Gabor | 360/52 |
| 3,482,229 | 12/1969 | Burr | 360/52 |

*Primary Examiner*—Vincent P. Canney
*Attorney, Agent, or Firm*—Michael S. Striker

[57] ABSTRACT

First and second information sequence are stored character interlaced and bit serially on one track of a magnetic tape, each character of each sequence occupying a determined length of tape. A second track on the tape has markings extending the length of each character of the first information sequence. A read head senses the markings and furnishes a square wave signal having positive portions indicating characters of the first sequence and negative portions indicating characters of the second sequence. A single read-write head senses the information on the first track and a control circuit has a first and second AND-gate for, respectively, transmitting signals from the read-write head to an output terminal in response to a first externally applied selection signal in the presence of the positive half of the square wave and in response to a second externally applied selection signal in the presence of the negative portions of the square wave.

8 Claims, 5 Drawing Figures

DIGITAL STORAGE HAVING A PLURALITY OF INFORMATION SEQUENCES IN A SINGLE TRACK

This is a division, of application Ser. No. 162,083 filed on July 13, 1971, now U.S. Pat. No. 3,772,664.

BACKGROUND OF THE INVENTION

This invention relates to storage arrangements for digital information. In particular, it relates to such storage arrangements having elongated signal carrier means storing said information in serial form. It further relates in particular to storage arrangements wherein said elongated signal carrier means is transported along a predetermined path by stepwise transport means which have a driving phase of substantially constant velocity. The transport means are contolled in such a manner that a selected portion of said elongated signal carrier means assigned to a determined information unit is driven past energized read-write means during the drive or constant velocity phase of the transport means.

In the following discussion the digital information comprises a plurality of characters, each of the characters comprising a plurality of bits. This information is stored on a surface-type storage as for example a magnetic tape. The bits constituting such character may be stored in either parallel form in a plurality of tracks of the signal storage means and recorded and read out simultaneously, or they may be stored in serial form in a single track of the storage. While data processing arrangements in general use the parallel type of storage, the serial type of storage finds great application in so-called input-output devices which operate in conjunction with relatively slowly operating equipment as, for example, typewriters. Thus the relatively low processing speed of such a serial storage does not constitute a disadvantage, while its operational simplicity constitutes a great advantage in this type of application. Such equipment generally comprises transport means which transport the tape step-by-step, each step encompassing a portion of the tape which is sufficiently large for read out or recording of all bits of a character, including any necessary parity bits, at a constant velocity by means of a read-write head. Thus the steps of the transport means comprise a starting phase wherein the velocity increases continually, a driving phase wherein the velocity remains constant, and a braking phase of decreasing velocity. Generally speaking, no read out or recording should occur during the starting or braking phases because of the variation in velocity. Under such conditions, only approximately fifty percent of the track length can actually be utilized for storing purposes. This means that the already-limited storage of such storages due to the overall length limitations of the tape is further decreased.

SUMMARY OF THE INVENTION

It is an object of the present invention to provide a storage arrangement which combines a simple and exact control of the transport means with a better utilization of the storage capacity of above-described storage means.

This invention comprises a digital storage arrangement for storing digital information sequences having a plurality of characters, each of said characters having a plurality of bits. It comprises elongated signal carrier means having a first track storing a first and second information sequence serially and in character-interlaced form, each of said characters occupying a determined character length along said first track. The elongated signal carrier means further have a second track having a plurality of markings indicative of the beginning and end of each of said characters of said first information sequence. Transport means transport said elongated signal carrier means stepwise along a predetermined path, each of said steps having a driving phase of substantially constant velocity, a starting phase of increasing velocity, and a braking phase of decreasing velocity. Further provided are read-write means in operative proximity to said first track and sensing means for sensing said markings on said second track and furnishing marking signals in response thereto. Control circuit means are connected to said sensing means and said transport means for controlling said transport means in response to said markings and in response to a first and second external selection signal, in such a manner that portions of said elongated signal carrier means assigned to said first information sequence are transported past said read-write head at a constant velocity in the presence of a first external selection signal and portions of said elongated signal carrier means assigned to said second information sequence are transported at a constant velocity past said read-write head in the presence of said second external selection signal.

In a preferred embodiment of the present invention, the markings extend along the character length portions of said elongated signal carrier means assigned to said first information sequence, the spaces between said markings thereby extending along the portions of signal carrier means assigned to said second information sequence.

In a preferred embodiment of the present invention an OR gate is provided which furnishes an output pulse for the duration of the marking signal in the presence of a first selection signal, and in the absence of a marking signal in the presence of a second selection signal. The trailing edge of the output pulse of the OR gate is used to initiate the braking phase of the transport means. Further provided is an AND gate which is gated by the output pulse of the above-mentioned OR gate to permit transmission of signals from the read-write means in the presence of said output pulse.

In a particularly preferred embodiment of the present invention, the length of elongated signal carrier means transported during the starting phase, is equal to that transported during the braking phase, while the sum of the so-transported lengths is equal to the length of signal carrier means transported during the driving phase.

In a particularly preferred embodiment of the present invention, the above-mentioned markings comprise perforations in the tape, each of the perforations being of substantially rectangular shape and having two sides perpendicular to the direction of motion of the tape and two sides parallel to said direction of motion. The length in the direction of motion of the tape corresponds to the above-mentioned character length. The space between the perforations is also equal to a character length. The perforations may be sensed by optical means, the path from a light source to a photosensitive element being completed by said perforations.

It is particularly advantageous if the cylindrical surface of a guide rod controlling the motion of the tape in the vicinity of a perforation is used to provide a reflection of the light from the source towards the photosensitive element. In this manner, only a narrow strip of light parallel to the lengthwise edge of the perforations is impinged upon the photosensitive element. This causes the marking signal derived from the photosensitive element to have relatively sharp leading and trailing edges.

It is further advantageous if the sensing arrangement in the direction of transport of the tape is placed at a small angle relative to the perpendicular to the surface of the tape. This tends to minimize reflections from the tape surface.

A further advantage from the present invention results if the magnetic tape is housed in a cassette which is brought in operative association with the sensing arrangement and the transport means when inserted into the apparatus containing the storage arrangement of the present invention.

The novel features which are considered as characteristic for the invention are set forth in particular in the appended claims. The invention itself, however, both as to its construction and its method of operation, together with additional objects and advantages thereof, will be best understood from the following description of specific embodiments when road in connection with the accompanying drawing.

DESCRIPTION OF THE PREFERRED EMBODIMENTS

Figure 1:
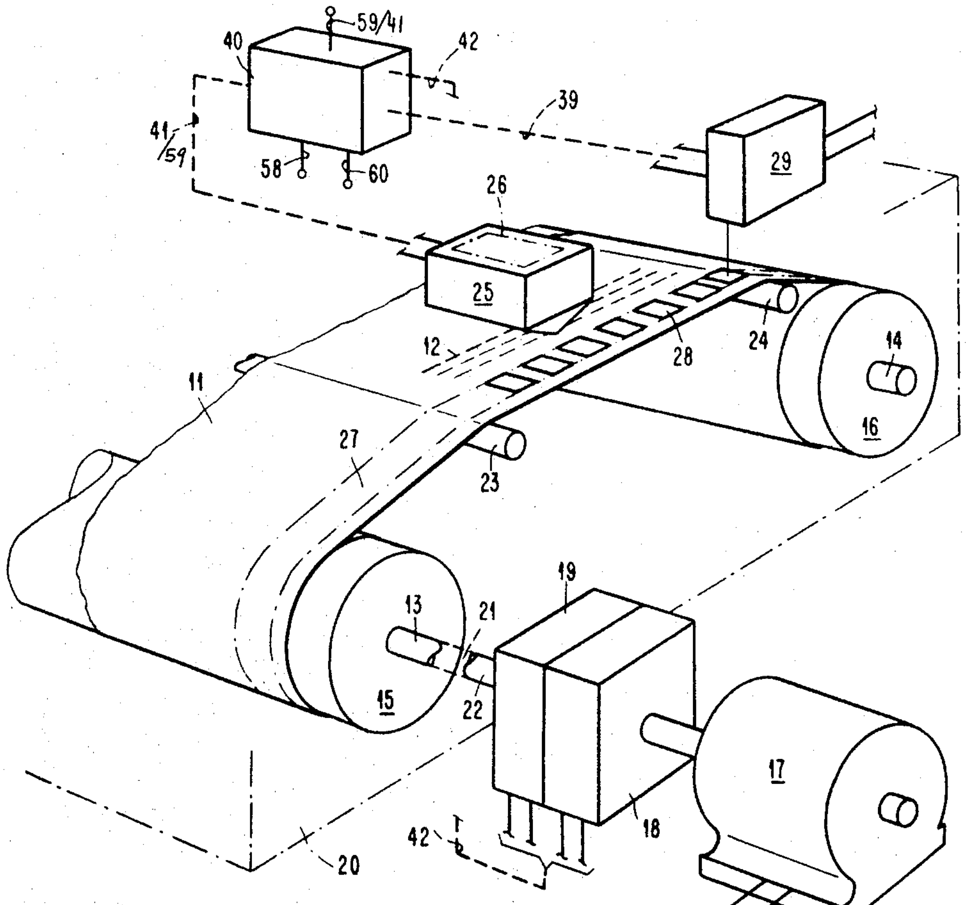
FIG. 1 shows an arrangement of the present invention in diagrammatic form.

A preferred embodiment of the present invention will now be described with reference to the drawing.

The elongated signal carrier means illustrated in FIG. 1 are a magnetic tape 11 which has a plurality of parallel tracks 12. The tape may be wound back and forth between reels 15 and 16 which are mounted respectively on shafts 13 and 14. Transport of the tape in the recording or read out direction is effected by a continuously operating motor 17 which may be connected with shaft 13 carrying reel 15 by means of a controllable magnetic coupling 18 and a controllable magnetic brake 19. The re-winding means and the means for maintaining the proper tension in the tape, are not shown, since they do not constitute a part of the present invention and are not necessary for the understanding thereof. The tape 11 and the reels 15 and 16 are mounted in a changeable cassette whose housing is indicated by the dash-dot line 20. When the cassette is inserted in the equipment containing the storage arrangement of the present invention, the shaft 13 is automatically connected to the drive shaft 22 by means of a conventional claw coupling indicated by dashed lines numbered 21 in FIG. 1.

In the operating region, that is in the vicinity of read-write head 25, the tape is maintained in a horizontal plane by means of guide rods 23 and 24. Read-write head 25 may comprise a plurality of magnets and is connected to an arrangement 26 indicated by dashed lines but not further illustrated, which is operable to move the head in a direction perpendicular to the surface of the tape and in a direction perpendicular to the tracks, thereby allowing the head to be brought into operative proximity to a selected one of the number of parallel tracks shown on the tape.

A track 27 on tape 11 has a plurality of optically scannable markings spaced at equal distances from each other which are used to control the tape transport and the read out from head 25. In the example shown, the markings are rectangular perforations 28. The scanning arrangement is denoted by reference numeral 29 which is arranged over the surface of the guide rod 24. The cylindrical surface of guide rod 24 serves as a reflection surface for the scanning light beam.

Figure 2:
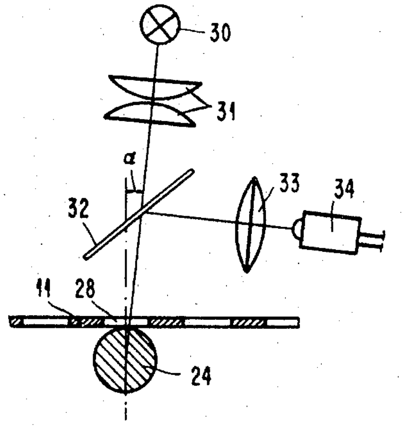
FIG. 2 shows a first embodiment of the sensing arrangement of the present invention.

A scanning arrangement is shown in FIG. 2. A light source 30 generates a light beam which passes through a condensor lens 31 and a semi-transmissive mirror 32, and, in the presence of a perforation, impinges upon the upper surface of guide rod 24. Because of the curvature of the reflection surface, a narrow strip of light in the same plane is reflected to the semi-transmissive mirror 32 and is reflected therefrom through objective 33 onto the photosensitive element 34. The light strip formed on the surface of photosensitive element 34 by objective 33 is parallel to the lengthwise edge of perforation 28. As a result of this, the edges of perforation 28 cause sharp light to dark transitions in the scanning arrangement 29. The direction of propogation of the incident light beam upon the surface is at a small angle $\alpha$ relative to the perpendicular to the surface of the tape. This substantially eliminates any stray reflections from the upper surface of the tape.

Figure 3:
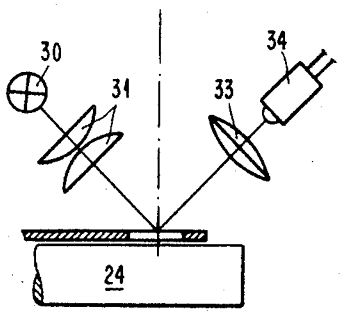
FIG. 3. shows a further embodiment of the optical sensing arrangement of the present invention.

FIG. 3 shows an alternate embodiment of the scanning arrangement. In this arrangement, the light beam emanating from the source 30 is impinged upon surface 14 by a condensor lens 31 at a perdetermined angle. Objective 33 and element 34 are placed in the direction of the reflected beam. All the optical elements lie in a plane determined by the center of the guide rod.

As stated above, the digital information in a first and second information sequence to be entered upon the tape or read from the tape, comprises a plurality of characters each of the characters comprising a plurality of bits. The characters are entered upon the tape in serial form, that is the bits constituting the coding of each characterr are entered sequentially in the direction of transport of the tape or, in other words, along the track. Thus a determined length of tape, herein designated as character length, is required for entering of all the bits constituting a character. The character length also includes any length required for the inclusion of parity bits and space required for providing the necessary tolerances at the end of each character length. All character lengths along the tape are equal. It must be further kept in mind that the transport means are stepwise transport means requiring a starting phase of increasing velocity until the proper operating velocity is reached, and a braking phase of decreasing velocity wherein the speed is decreased from the constant operating speed to a stop. Further it is necessary that the character to be read out is transported past the read-write head at a constant speed, that is during the driving phase of the transport means. Thus the markings are separated by spaces which are provided to accommodate the braking phase associated with the previously read out or entered character and the starting phase associated with the next sequential character to be entered or read out. Braking of the transport means is accomplished by means of coupling 18 and brake 19.

Figure 4:
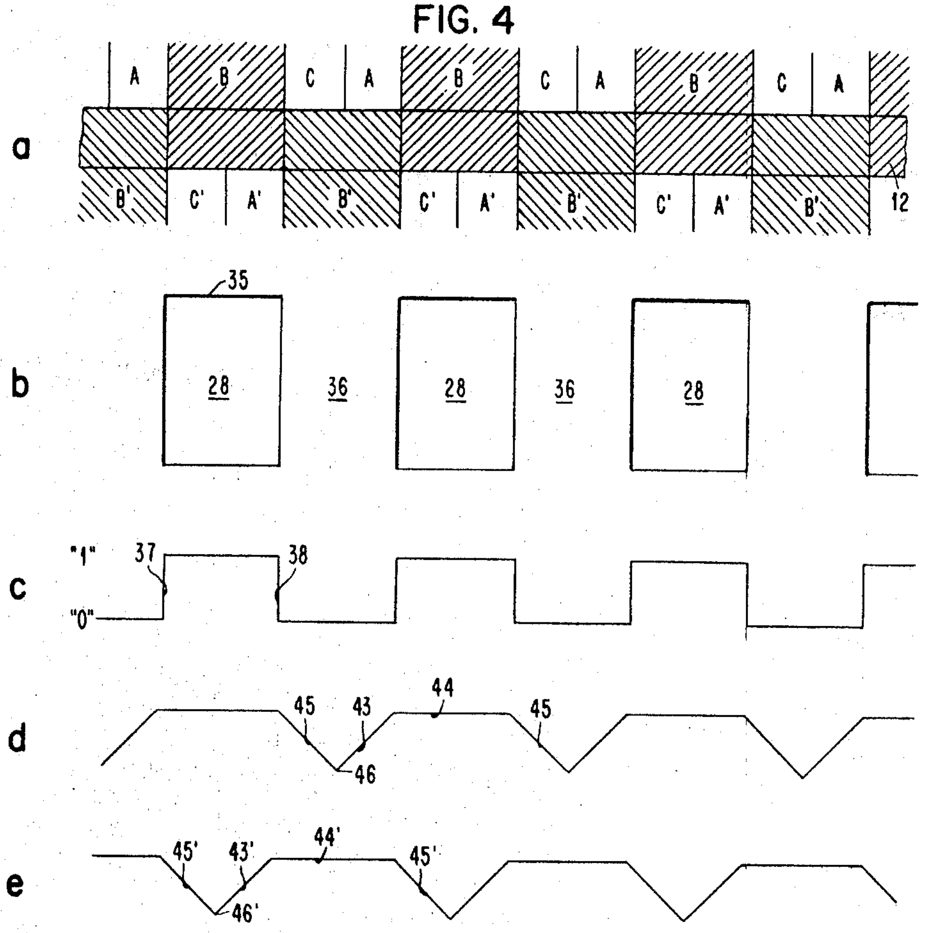
FIG. 4 is a diagram showing the first and second tracks on the elongated signal carrier means with the first and second information sequence and the markings.

FIG. 4 shows a section of an information carrying track in line *a* and a section of the second track having the markings in line *b*. The sections of track 1, shown in line *a*, labelled A correspond to the length of track transported during starting phase, the portions of track labeled B are the portions containing the characters and are to be transported past the read-write head during the driving phase, while the portions indicated as C correspond to the braking phase. As indicated in line *a* of FIG. 4, the elements determining the start-stop operation, and particularly coupling 18 and brake 19, operate in such a manner that the length of combined regions C and A is substantially equal to the length of the portion labeled B. For example, section A and C can each be approximately 0.5mm long, while the length in the transport direction of portion B may be 1 mm.

As shown in line *b* of FIG. 4, the perforations 28 which are located opposite sections B in line *a* have edges 35 in the direction of motion of the tape, which edges have the same length as the portions B in line *a*. Further, the spaces 36 between adjacent perforations 28 correspond to the combined length of sections C and A in line *a* of FIG. 4.

As mentioned above, the perforations in track 27 serve to control the recording and read out information, as well as the movement of the tape. By scanning perforations 28, the scanning arrangement 29 furnishes signals shown in line *c* of FIG. 4. Leading edge 37, which results from the scanning of the front edge of one of the perforations, corresponds to a transition from a 0 level to a 1 level and, on the other hand, the edge 38 results from the scanning of the trailing edge of the perforation and corresponds to a transition from a 1 level to a 0 level.

The marking signals, that is the output of scanning arrangement 29, are furnished to control circuit means 40 via line 39. An input to control circuit 40 is furnished via line 41 to read-write head 25 allows signals from this head to become effective only for sections B of track A for which the scanned signal level is a 1 level. That is, signals from head 25 are transmitted to terminal 59/41 through the control circuit under the above-described condition during read-out. During recording, signals are applied at terminal 59/41 and transmitted to line 41/59 (i.e., to the recording head 25) under the same condition (see also FIG. 5). If the scanning arrangement 29 is properly spaced in relation to read-write head 25, that is if either the read-write head is on the same line perpendicular to the direction of the tracks as scanning arrangement 29, or, alternatively, the read-write head is placed an integral multiple of perforations away from scanning arrangement 29 in lengthwise direction of the tape, then the region B will be scanned simultaneously with the sensing of a perforation, that is when the marking signal is a level 1 signal. Further, control circuit means 40 yield a signal via line 42 to coupling 18 and brake 19 which is derived during the scanning of the trailing edge of a perforation, that is during the scanning of an edge 38. Thus, at the end of each character length B, the braking phase is initiated, causing the tape to stop at the end of tape portion C. A start signal applied to the input of coupling 18 and brake 19 can cause the band to be transported again. It then enters the starting phase A and, upon reaching the subsequent leading edge of the next perforation 28, again reaches its maximum driving speed. Line *d* of FIG. 4 shows the variation of speed in a highly simplified form. It is noted that portions A of line *a* correspond to section 43 with increasing velocity, portions B of line *a* correspond to section 44 with substantially constant speed, while sections C of line *a* correspond to lines 45 indicating decreasing velocity. Point 46 represents the stopped position of the tape, that is the dividing line between portions A and C.

Track 12 of the tape, herein referred to as the first track, also stores a second information sequence. The portions of the tape carrying the second information sequence correspond to the same letters designating the portions carrying the first information sequence, but are denoted by a prime. It is seen that the starting and braking phases of the second information sequence coincides with the driving phase of the first information sequence, and vice versa. The tape speed for this mode of operation is indicated in line *e*.

The starting and braking velocities, 45' and 43', respectively, coincide with the driving phase 44, while the driving phase 44' coincides with the braking and starting phase 45 and 43. The second information sequence can also be read out by means of perforations 28 in conjunction with scanning means 49 and control circuit means 40.

Figure 5:
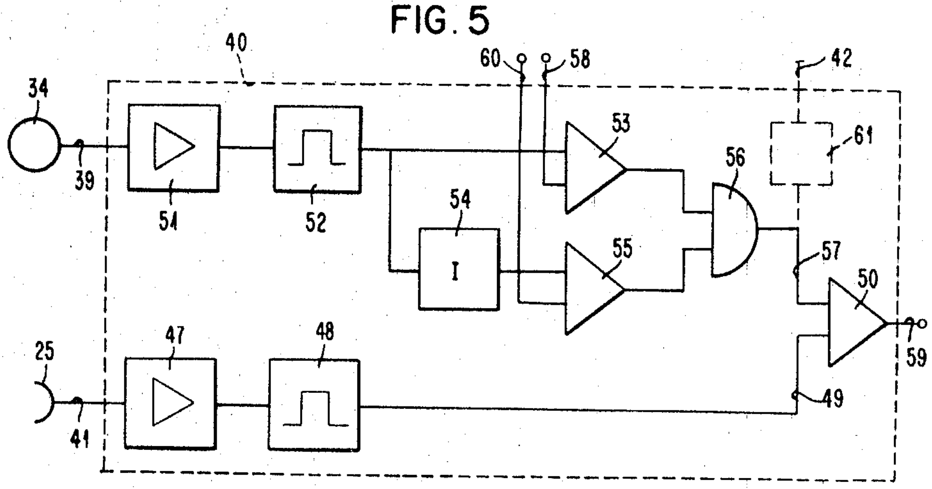
FIG. 5 is a block diagram of the control circuit of the present invention.

FIG. 5 shows the control circuit. The signals read out be read-write head 25 are supplied to the input of the control circuit 40 via line 41. An amplifier 47 and pulse shaper 48 furnish standard pulses in response to each bit read out by head 25.

The marking signal, that is the signal supplied by the photosensitive element 34, is applied to an amplifier 51 followed by a pulse shaper 52. The output signal of pulse shaper 52 is connected one input of an AND gate 53 whose other input is connected to a line 58 furnishing the first selection signal. The output of pulse shaper 52 is also connected to an input of inverter 54 whose output is connected to the second input of an AND gate 55 whose first input is connected to a line 60 furnishing the second selection signal. The outputs of AND gates 53 and 55 are connected to two inputs of an OR gae 56 whose output is in turn connected to an input of AND gate 50 via a line 57. Inverter 54, AND gates 53 and 55, and OR gate 56, together constitute selector switch means. The output of AND gate 50 furnished at a terminal 59 constitutes the data output. Terminal 59 is herein referred to as the data transmission terminal.

The arrangement operates as follows: If a selection signal is applied to line 58, AND gate 53 is gated to permit transmission of the marking signals, that is the pulses derived from the output of pulse shaper 52. OR gate 56 than furnishes one input to AND gate 50, allowing any signals (of the first information sequence) read out by read-write head 25 to be transmitted through AND gate 50 to the data transmission terminal 59. In the absence of a marking signal, that is a signal at the output of pulse shaper 52, AND gate 53 is blocked. AND gate 55 is blocked due to the absence of a selection signal on line 60. Therefore, no output can result from OR gate 56 and AND gate 50 is blocked, causing signals read out by read-write head 25 from the second information sequence to be blocked from the data transmission terminal. In the presence of a selection signal on line 60, AND gate 55 becomes transmissive allowing inverted marking signals furnished by inverter 54 to pass through AND gate 55 and then through OR gate 56, thus allowing passage of signals read from read-write head 25 in the absence of a marking signal. These signals of course are the signals associated with the second information sequence. In both cases, the signals are read from read-write head 25, while the transport means are in the driving (constant velocity) phase.

The output of OR gate 56 is also applied to a circuit 61 furnishing an output to a line 42. This circuit may for example be a differentiating circuit operative on the trailing edge of the pulse furnished by OR gate 56, the signal on line 42 being used to initiate the braking phase of the transport means, that is the signal on line 42 is applied to coupling 18 and brake 19. It should be noted that a pulse is always present at the output of gate 56 during read out of an information series, regardless of which information series it is. Thus the trailing edge of this pulse always indicates the initiation of the braking phase.

While the invention has been illustrated and described as embodied in particular sensing, control and transport arrangements, it is not intended to be limited to the details shown, since various modifications, structural and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a digital storage arrangement having elongated signal carrier means having a first and second track and having a first and second information sequence, each of said information sequences having a plurality of characters, each of said characters having a plurality of bits, stored on said first track bit serially and in character-interlaced form, and wherein each of said characters occupies a determined character length along said first track, said elongated signal carrier means further having a second track having a plurality of markings for indicating the beginning and end of each of said characters of said first information sequence, a read-out system for selectively reading out said first or said second information sequence, comprising, in combination, read-out means positioned in operative proximity of said first track for sensing said recorded first and second information sequences and furnishing corresponding information signals; externally operable selection means for furnishing a first selection signal indicating desired read-out of said first information sequence or a second selection signal indicating desired read-out of said second information sequence; sensing means positioned in operative proximity to said second track for sensing said markings on said second track and furnishing first marking signals, each present throughout the read-out of a character of said first information sequence, in response thereto; and control circuit means having a first input connected to said read-out means, a second input connected to said sensing means, a control input connected to said selection means, and a data transmission output, for transmitting signals from said read-out means to said data transmission terminal only in the simultaneous presence of said first marking signals and said first selection signal or in the absence of said first marking signal and the presence of said second selection signal.

2. An arrangement as set forth in claim 1, wherein each of said markings extend a distance along said second track substantially equal to said determined character length, the position of each of said markings along said second track corresponding to the position of a coresponding one of said characters of said first information sequence along said first track.

3. An arrangement as set forth in claim 2, wherein the distance between sequential ones of said markings is substantially equal to said determined character length.

4. An arrangement as set forth in claim 3, wherein said signal carrier means is a magnetic tape; wherein said read-out means comprise a first read head for reading information from said magnetic tape and first pulse shaper means connected to said first read head for furnishing said information signals; wherein said sensing means comprise a second read head and second pulse shaper means connected to said second read head for furnishing a substantially square wave signal, alternate halfwaves of said square wave signal constituting said first marking signal.

5. An arrangement as set forth in claim 4, wherein the positive portions of said square wave constitute said first marking signals and wherein said negative portions of said halfwave constitute second marking signals, each of said second marking signals being indicative of the presence of a character in said second information sequence.

6. An arrangement as set forth in claim 1, wherein said control circuit means comprise a first and second control input for receiving, respectively, said first and second selection signals, logic circuit means connected to said first and second control input and said sensing means for furnishing a data selector signal upon simultaneous presence of said first selection signal and said first marking signal or said second selection signal in the absence of said first marking signal, and a first AND-gate having an output connected to said data transmission terminal, a first input connected to said read-out means and a second input connected to the output of said logic circuit means, for transmitting data to said data transmission terminal in the simultaneous presence of said data selector signal and a signal sensed by said read-out means.

7. An arrangement as set forth in claim 6, wherein said logic circuit means comprise a second AND-gate having a first input connected to said second control input, a second input connected to said sensing means and a second AND-gate output, a third AND-gate having a first input connected to said first control input, a second input connected to said sensing means and a third AND-gate output, and an OR-gate having a first and second input respectively connected to said second and third AND-gate outputs and having an OR-gate output connected to said second input of said first AND-gate.

8. An arrangement as set forth in claim 1, wherein said read-out means comprise read/record means; further comprising means for furnishing an information sequence to be recorded in said first track; and wherein said means for furnishing said information sequence is connected to said first input of said control circuit means and said read/record means is connected to said data transmission terminal, whereby said information sequence to be recorded is recorded on said first track to constitute said first or second information sequence in dependence, respectively, on receipt of said first or second selection signal.

* * * * *